Patented Apr. 15, 1924.

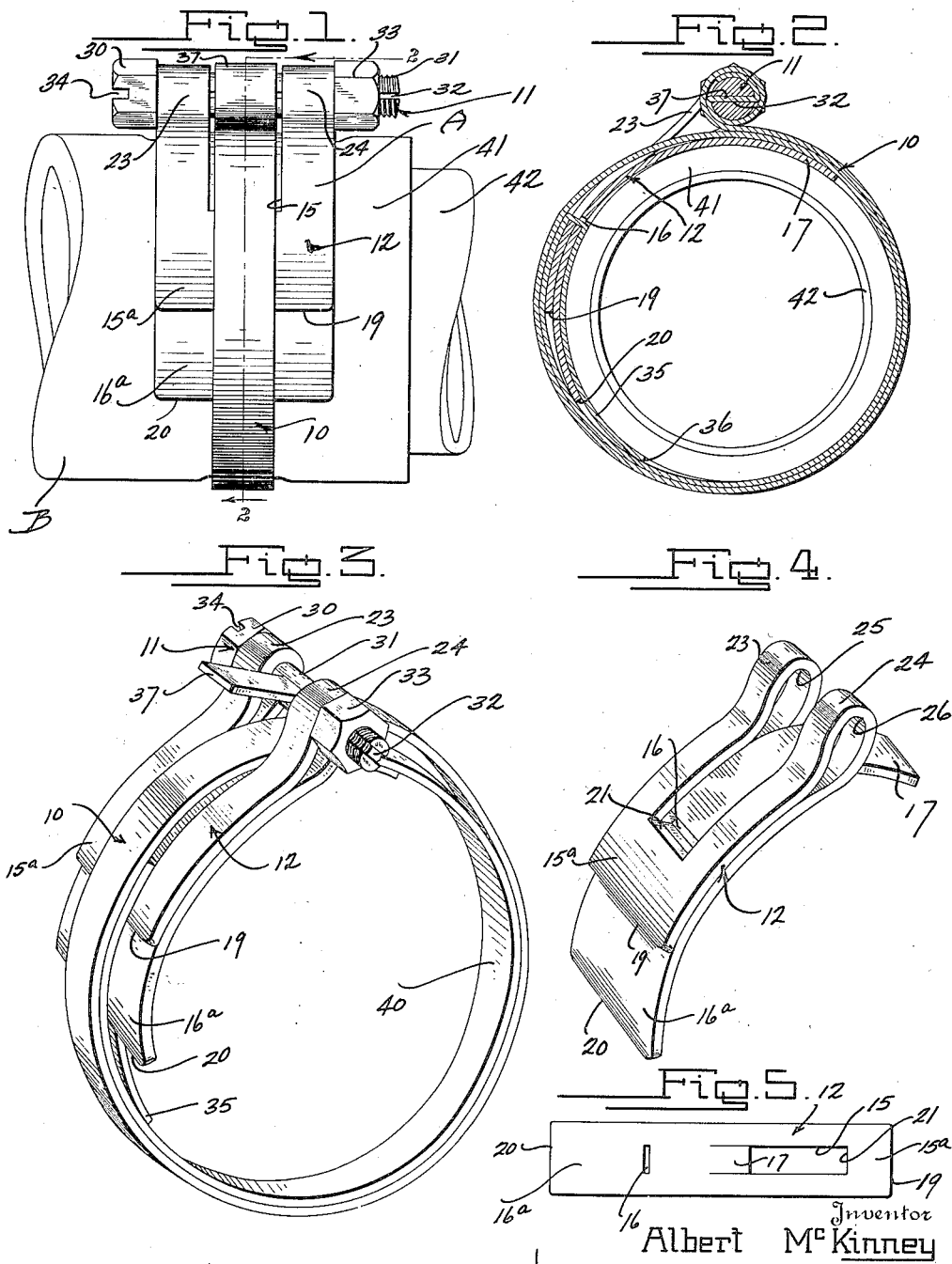

1,490,618

UNITED STATES PATENT OFFICE.

ALBERT McKINNEY, OF WEST FRANKFORT, ILLINOIS.

CLAMP FOR HOSE AND FLEXIBLE TUBING.

Application filed October 23, 1922. Serial No. 596,391.

*To all whom it may concern:*

Be it known that I, ALBERT McKINNEY, a citizen of the United States, residing at West Frankfort, in the county of Franklin and State of Illinois, have invented certain new and useful Improvements in a Clamp for Hose and Flexible Tubing, of which the following is a specification.

This invention relates to an improved connection for rubber hose and other flexible tubing.

The primary object of this invention is the provision of a relatively simple type of connection which is adapted for use in the connecting of flexible hose or other tubing, embodying an improved binding arrangement, which entirely encircles the hose for producing a clamping effect about the entire circumference of the same.

A further object of this invention is the provision of a hose connection which is compact in arrangement, so that the same may be conveniently applied to hose or other tubing for connecting purposes, without undue bulk and cumbersome projections, such as incidental to many types of hose clamp.

A further object of this invention is the provision of a hose clamp which will give a clamping action about the entire circumference of that portion of the hose which is clamped, and which embodies a locking arrangement which cooperates with the clamping strain upon the improved device in maintaining the same in a clamped position.

Other objects and advantages of this invention will be apparent during the course of the following detailed description.

In the accompanying drawing, forming a part of this specification, and wherein similar reference characters designate corresponding parts throughout the several views, Figure 1 is a side elevation of the improved hose clamp, showing the same as connected upon a piece of flexible hose and metallic tubing.

Figure 2 is a transverse cross sectional view, taken substantially on the line 2—2 of Figure 1.

Figure 3 is a perspective view of the improved clamp.

Figure 4 is a perspective view of a connecting strap used as a detail of the improved clamp.

Figure 5 is a plan view of the detail illustrated in Figure 4 in developed form.

In the drawing, wherein for the purpose of illustration is shown but the preferred embodiment of this invention, the letter A designates the improved clamp adapted for use upon hose or other flexible tubing B.

Referring to the improved clamp A, the same preferably includes a binding strip 10; bolt arrangement 11; and connecting strap 12.

The binding strip 10 is preferably of flexible metal or analogous material and of uniform cross section throughout the length thereof. The strap 12 may be of the same material as the binding strip 10. In its developed form, the strap 12 is rectangular in formation and provided with the rectangular shaped slot 15 extending longitudinally thereof adjacent the other end $16^a$. A tongue 17 is struck from the same and extends longitudinally of the strap 12 upwardly into the longitudinal slot 15. The connecting strap 12 is bent into concavo-convex arcuation, so that the end $15^a$ overlies the end $16^a$ with the outer marginal edge 19 of the end $15^a$, however, terminating short of the outer marginal edge 20 of the end $16^a$. In this relation, the marginal edge 21 of the slot 15 aligns with an edge of the slot 16. The tongue 17 extends outwardly from the arm portions 23 and 24, which are provided by doubling the member 12 upon itself. The arms 23 and 24 are, of course, in spaced relation and respectively provided with apertures 25 and 26 which are in aligning relation and in which the bolt 11 bears.

The bolt 11 is provided with a head 30 and a screw threaded shank 31, the latter being slotted as at 32 for substantially the entire length thereof. A nut 33 is adapted for adjustable mounting upon the screw-threaded shank 31 in a manner which will be subsequently described. The head 30 may be slotted as at 34 for receiving the blade of a screw driver, and in addition may be of polygonal formation for receiving a wrench.

In assembling the device, one end 35 of the binding strip 10 is inserted through the slots 15 and 16 of the connecting strap 12 and bent in concavo-convex formation to lie in snug relation upon the concave surface of the end $16^a$ of the connecting strap 12. It is to be noted that the end 35 is sufficiently long that the end marginal edge 36 thereof extends outwardly of the end marginal edge 20 of the strap 12. The binding strip 10 is then looped in circular manner, so that a portion rests upon the tongue 17 within the slot 15 beneath the shank 31 of the bolt member 11, and the strip 10 is doubled upon itself in encircling manner and having its extreme end 37 then threaded through the slot 32 of the bolt shank 31 intermediate the looped arms 23 and 24, substantially as is illustrated in Figure 3 of the drawing. In this manner the binding strip 10 is looped in a double fold to provide the circular opening 40 through which the hose or other tubing B is disposed.

In use upon the ordinary hose arrangement B, the external rubber casing 41 and the internal metal tubing 42 are disposed through the opening 40 of the binding strip 10. The operator then rotates the bolt member 11 within the bearing openings 25 and 26 of the connecting strap 12, and which winds the end 37 of the binding strip 10 about that portion of the shank 31 intermediate the arms 23 and 24. Further rotation of the bolt 11 in this manner will contract the opening 40 defined by the binding strip or loop 10, so that it can readily be understood that the binding strip 10, co-operating with the tongue portion 17 of the connecting strap 12, will provide a circumferential grip about the rubber tube 41, in order that the latter may be securely clamped upon the tubing 42. Since the nut 33 cooperates upon the screw threads on the bolt shank 31, it can readily be understood that the nut 33 will engage the outer marginal edge of the connecting strap arm 24 so that the bolt 11 may be locked in a predetermined position with respect to the connecting strap, in order to maintain the loop of the connecting strap 10 in a definite clamping relation. The force incident to contraction of the strip 10 on the hose arrangement B will tend to rotate the bolt 11 so that the nut 33 will be the more securely locked in its engagement with the connecting strap 12.

From the foregoing description of this invention, it can readily be seen that an improved hose or flexible tube clamp has been provided, which is relatively compact in formation in that the ends of the various details thereof have been staggered so that they do not overlie each other and consequently no unsightly offsets are provided thereon. In addition, the adjusting bolt 11 has been disposed parallel with the axis of the loop defined by the binding strip 10, so that when disposed upon the hose or other article B, said bolt extends longitudinally of the hose B and can readily be adjusted either by a wrench or by means of a screw driver. The improved device may, of course, be used in connection with various devices which need clamping and connecting, and need not necessarily be restricted to use in connection with hose.

Various changes in the shape, size and arrangement of parts may be made to the form of the invention herein shown or described, without departing from the spirit of the invention or the scope of the claims.

I claim:

1. A clamp comprising a strap member having an aperture transversely therethrough and having a pair of spaced arms extending outwardly therefrom, said arms being apertured in aligning relation, said strap having a flexible tongue extending outwardly of said arms from the space therebetween, a bolt member rotatably bearing in the apertures of said strap arms and having a slot transversely therethrough in that portion which lies intermediate said arms of the strap member, and a binding strip of flexible material having one end connected in fixed relation in the transverse slot in said strap and looped in double folded manner to have a fold thereof lying over the tongue of said strap member and having the other free end thereof engaging through the transverse slot of said bolt, whereby upon adjustment of the bolt, the binding strip may be contracted or expanded as to the opening of its loop.

2. A clamp comprising a binding strip of flexible metal, a connecting strap provided with a longitudinally extending slot providing spaced side portions and having an opening in spaced relation to the inner end of the slot, said strap being folded back upon itself and providing a pair of spaced arms having free ends provided with apertures in aligning relation, a bolt rotatably bearing in the apertures of said strap arms and having a longitudinally extending slot and having a screw threaded end extending outwardly from one of said arms, said strip being looped and threaded through the opening and space provided by the arms of said connecting strap, the free end thereof extending through the slot of said bolt whereby upon rotational movement of the bolt, the end of said strip may be wound about said bolt in order to contract the opening defined by said binding strip.

3. A clamp comprising a binding strip of flexible material, a connecting strap having an opening intermediate its length and having one end portion provided with bearing elements spaced transversely of the strap, a tongue extending outwardly and longitudinally of the strap between the bearing elements, a securing bolt rotatably mounted in the bearing elements and having a transversely extending slot between the bearing elements, said binding strip having one end portion secured in the opening of said strap and said strip being formed into a loop and passed over said tongue and between the bearing elements and extending over said strap and about the first loop and having a second end portion passed through the opening in said bolt whereby rotation of the bolt will wrap the strip thereon and reduce the size of the loop, and a securing nut carried by said bolt and engaging the outer end of one of said bearing elements.

4. A clamp comprising a binding strip of flexible material, a connecting strap having bearing elements at one end spaced transversely of the strap and a tongue between the bearing elements extending longitudinally of the strap and beyond the bearing elements, a bolt rotatably mounted in said bearing elements, said binding strip having one end connected with said strap and extending from the opposite end of the strap from said bearing elements and being formed into a coil with a portion of the coil passing over said tongue and between the bearing elements and along the upper face of the strap and having a second end connected with the bolt between the bearings, and means for securing the bolt against retrograde rotation after the bolt has been rotated to wind the strip thereon and reduce the size of the loop formed by the strip.

ALBERT McKINNEY.